United States Patent [19]

Johnson et al.

[11] Patent Number: 5,009,971

[45] Date of Patent: Apr. 23, 1991

[54] GAS RECOMBINANT SEPARATOR

[75] Inventors: Harlan B. Johnson, Rittman; Samuel B. Laferty, Akron; Melvin P. Wagner, Wadsworth; Shantilal M. Mohnot, Copley, all of Ohio

[73] Assignee: PPG Industries, Inc., Pittsburgh, Pa.

[21] Appl. No.: 391,067

[22] Filed: Aug. 9, 1989

Related U.S. Application Data

[63] Continuation-in-part of Ser. No. 240,851, Sep. 2, 1988, abandoned, which is a continuation-in-part of Ser. No. 25,540, Mar. 13, 1987, abandoned.

[51] Int. Cl.$^5$ ............................................. H01M 2/16
[52] U.S. Cl. ................................ 429/252; 210/510.1; 428/331; 264/41; 264/175
[58] Field of Search ............... 428/422, 421, 220, 413, 428/331, 323, 308, 236; 429/251, 252, 144; 210/500.1, 510.1; 502/263; 252/425.3; 269/41, 49, 120, 175; 523/218

[56] References Cited

U.S. PATENT DOCUMENTS

| | | | |
|---|---|---|---|
| 2,302,832 | 11/1942 | Behrman | 523/218 |
| 3,005,795 | 10/1961 | Froemming et al. | 525/154 |
| 3,129,134 | 5/1964 | Lagerstrom | 162/181 |
| 3,351,495 | 11/1967 | Larsen et al. | 429/152 |
| 3,407,249 | 10/1968 | Landi | 264/49 |
| 3,679,614 | 7/1972 | Shah et al. | 521/62 |
| 3,696,061 | 10/1972 | Selsor et al. | 521/64 |
| 3,838,092 | 9/1974 | Vogt et al. | 260/33.6 |
| 3,864,124 | 2/1975 | Breton et al. | 75/212 |
| 4,042,747 | 8/1977 | Breton et al. | 428/323 |
| 4,153,661 | 5/1979 | Ree et al. | 264/120 |
| 4,194,040 | 3/1980 | Breton et al. | 428/308 |
| 4,208,194 | 6/1980 | Nelson | 55/158 |
| 4,226,926 | 10/1980 | Goldberg | 429/252 |
| 4,237,083 | 12/1980 | Young et al. | 264/41 |
| 4,285,751 | 8/1981 | Feinberg et al. | 156/242 |
| 4,294,899 | 10/1981 | Witherspoon | 429/206 |
| 4,335,193 | 6/1982 | Doi et al. | 429/251 |
| 4,354,958 | 10/1982 | Solomon | 252/425.3 |
| 4,373,519 | 2/1983 | Errede et al. | 128/156 |
| 4,460,642 | 7/1984 | Errede et al. | 428/283 |
| 4,508,849 | 4/1985 | Inoue et al. | 502/263 |
| 4,518,705 | 5/1985 | Solomon et al. | 502/101 |
| 4,565,663 | 1/1986 | Errede et al. | 264/120 |
| 4,693,928 | 9/1987 | Foss | 428/236 |
| 4,722,898 | 2/1988 | Errede et al. | 435/182 |
| 4,810,381 | 3/1989 | Hagen et al. | 210/502.1 |

FOREIGN PATENT DOCUMENTS

| | | |
|---|---|---|
| 0234619 | 9/1987 | European Pat. Off. |
| 57-123651 | 8/1982 | Japan |
| 59-105263 | 6/1984 | Japan |
| 60-35456 | 2/1985 | Japan |
| 62-93856 | 4/1987 | Japan |
| 2069021 | 1/1980 | United Kingdom |
| 2028877 | 3/1980 | United Kingdom |
| 2156576 | 10/1985 | United Kingdom |
| 2167600 | 5/1986 | United Kingdom ............... 210/500 |
| 2169129 | 7/1986 | United Kingdom ............... 210/500 |
| 86/01841 | 3/1986 | World Int. Prop. O. |

OTHER PUBLICATIONS

"PTFE Sheets Simplify Thin Layer Chromatography", Design News, May 8, 1989.
"Particulates Captured/Carried By Fibrillated PTFE", Design News, Feb. 9, 1987.
"Empore ™ Thin Layer Chromatography Sheets", Technical Data Sheet of 3M.
"Empore ™ Thin Layer Chromatography ... A Technology Breakthrough by 3M", Product Bulletin.

*Primary Examiner*—Stephen J. Kalafut
*Attorney, Agent, or Firm*—Irwin M. Stein

[57] ABSTRACT

Described is a porous flexible sheet of about 93 to 99.5 weight percent amorphous precipitated silica and from about 0.5 to about 7 weight percent fibrillated, unsintered polymeric material, e.g., polytetrafluoroethylene. The sheet is useful as a separator in absorbed electrolyte gas recombinant batteries, e.g., lead-acid batteries, and has a tensile strength of less than 75 pounds per square inch (0.5 MPa). The sheet preferably has a porosity of from 85 to 92 percent and exhibits an electrical resistance of less than 3.5 milliohm-in$^2$/10 mil when saturated with 37 percent sulfuric acid. The sheet is prepared by subjecting a dry homogeneous mixture of the silica and polymeric material, e.g., polytetrafluoroethylene, in the above proportions to mechanical shear blending forces to fibrillate the polymer and thereafter dry forming the resulting admixture into sheet form.

50 Claims, No Drawings

GAS RECOMBINANT SEPARATOR

CROSS REFERENCE TO RELATED APPLICATIONS

This application is a continuation-in-part application of our copending application Ser. No. 07/240,851, filed Sep. 2, 1988, which in turn is a continuation-in-part application of our application Ser. No. 07/25,540, filed Mar. 13, 1987, both of the same title and both now abandoned.

DESCRIPTION OF THE INVENTION

The present invention is directed to silica-containing battery separators. In commonly used electric storage batteries, such as the well known 12-volt battery employed in automobiles, separators are placed between battery plates of opposite polarity to prevent the two plates from touching and causing an electrical short. The separator is typically a microporous article fabricated from a polymeric material, e.g., natural or synthetic rubber, or a polyolefin. The separator may have a backing material of, for example, a non-woven web. The pores of the separator are customarily as small as possible since this reduces the danger of active materials being forced through or growing through the separator, thereby causing an electrical short.

Siliceous fillers have been used to prepare microporous battery separators for conventional electric storage batteries. See, for example, U.S. Pat. No. 2,302,832, which describes the use of a silica hydrogel in a rubber binder; U.S. Pat. No. 3,351,495, which describes synthetic and natural zeolites, precipitated metal silicates, such as calcium silicate, and silica gels as the inorganic filler and extender for separators of high molecular weight polyolefins; and U.S. Pat. Nos. 3,696,061, 4,226,926, and 4,237,083, which describe the use of finely divided, precipitated amorphous silica, such as Hi-Sil ® 233 silica, in microporous battery separators.

Amorphous precipitated silica is reported to be the vehicle for introducing porosity into and for reinforcing the polymeric material utilized to fabricate the battery separator. Such precipitated silica is highly absorbent and can absorb a substantial quantity of an aqueous or organic liquid while remaining free flowing. In conventional practice, the amorphous precipitated silica is first loaded with a liquid of choice, e.g., water or oil, and then blended with the polymeric material. The liquid absorbed by the silica filler is subsequently removed form the silica-polymer blend to impart porosity to the polymeric material. Battery separators containing between about 5 and about 70, e.g., between 15 and 50, weight percent of siliceous filler have been reported in the above-described patents.

Recently, completely sealed electrical storage batteries have been commercialized. Such batteries, e.g., lead-acid batteries, are sealed so that they can operate above atmospheric pressure, and are reported to use a highly porous and partially saturated glass microfiber separator. These batteries are referred to as absorbed electrolyte gas recombinant batteries since gas evolved at the battery plates is recombined within the battery. The battery separator used in the electrolyte gas recombinant battery is a key element of the battery because it absorbs sufficient electrolyte to provide normal battery electrical capacity while leaving a sufficient number of pores that do not contain electrolyte to permit gas, i.e., oxygen, liberated at the positive electrode, to pass freely to the negative electrode where it reacts to form water. The separator is reported to require the following properties:

1. High absorptivity in order to hold a sufficient quantity of electrolyte, i.e., battery acid;
2. Relatively small through-pores with high tortuosity in order to prevent shorts caused by dendrite growth;
3. High total porosity so that electric resistance of the separator is low;
4. Readily wet by sulfuric acid to allow for rapid absorption of the acid during battery assembly;
5. Resistant to attack by sulfuric acid and to oxidation; and
6. Adequate strength to permit handling during battery assembly.

It has now been discovered that non-woven, porous flexible sheets comprised principally of amorphous precipitated silica and a minor amount of fibrillated, unsintered fibers of a polymeric resin, e.g., a perfluorinated polymer such as polytetrafluoroethylene, may be used as a separator for absorbed electrolyte gas recombinant batteries.

DETAILED DESCRIPTION OF THE INVENTION

The separator of the present invention is a non-woven, porous flexible sheet or mat comprised of from about 93 to 99.5 weight percent synthetic amorphous silica and from 7 to about 0.5 weight percent of fibrillated, unsintered fibers of a polymeric material, particularly a perfluorinated polymer such as polytetrafluoroethylene. More commonly, the sheet or mat will comprise from about 95 to 98.5 weight percent of the silica and 1.5 or 2 to 5 weight percent of the polymeric fibers. In certain embodiments the sheet or mat will comprise from about 96 or 96.5 to about 98.5 or 99.5 weight percent synthetic amorphous silica, e.g., amorphous precipitated silica, and from about 3.5 or 4.0 to about 0.5 or 1.5 weight percent of fibrillated, unsintered fibers of a polymeric material. The sheet is naturally hydrophilic and has an Instron tensile strength of less than 75 pounds per square inch (PSI) (0.5 MPa), usually less than 65 psi (0.45 MPa) in both directions, i.e., machine direction or cross direction. Tensile strengths of between about 5 (34.5 kPa) and 55 psi, e.g., between about 25 and 55 PSI (172 kPa-379 kPa), e.g., 40 psi (276 kPa) may also be suitable for use with commercial assembly processes. The tensile strength in the direction perpendicular to the machine direction may be less than the tensile strength in the machine direction, i.e., the cross machine direction strength may be a low as 5 psi. The fibrillated polymeric fibers intertwine and hold together the amorphous precipitated silica when it is formed into a shaped article, like a sheet; but the fibers are not adhesively bonded or affixed to the silica and remain essentially as a separate entity in the shaped article. The porosity of the sheet is preferably in the range of from about 85 to 92 percent, e.g., 88-90 percent. The electrical resistance of the sulfuric acid saturated-sheet is preferably less than about 3.5, more preferably less than about 2.5, and still more preferably less than 1.5, milli-ohm-in$^2$/10 mil.

Polymeric materials that may be used to prepare the battery separators described herein are those that are solid and that form fibrils or fibers, e.g., microfibers, when subjected to intensive mixing, i.e., fibrillation.

The process of fibrillation involves subjecting solid particles, e.g., spherical particles, to sufficient shear stress along the orientation axis of the particle so that the molecules of the particle slip relative to each other with the consequent formation of an elongated thin fibril.

Fibrillatable polymeric materials that may be used herein may be selected from high molecular weight polyolefins such as polyethylene, polypropylene, polybutene, polyisobutylene, copolymers of ethylene and propylene, copolymers of ethylene and butene, copolymers of propylene and butene and terpolymers of ethylene, propylene and butene. Other polymers contemplated include the polyacrylates such as polymethyl acrylate, polymethyl methacrylate and, more generally, polymers prepared from the $C_1$-$C_4$ alkyl esters of acrylic and methacrylic acid. Also contemplated are polyamide products such as nylon-type products and aromatic polyamide type products. The former are aliphatic polyamides prepared from adipic (and related acids) and hexamethylene diamine (and related diamines) by condensation. The latter, e.g., KEVLAR ®-type polyamides are polyamides in which greater than 85 percent of the amide linkages are attached to two aromatic rings. Further, products obtained from natural materials such as cellulose, are also contemplated.

Halogen, e.g., fluorine and/or chlorine, containing polymeric resins contemplated herein include polyvinyl chloride, polyvinylidene chloride, copolymers of vinyl chloride and vinyl acetate, polyvinyl fluoride polyvinylidene fluoride and perfluorinated polymeric materials. Perfluorinated polymers are preferred because of their high resistance to chemical attack. Examples of such perfluorinated polymeric materials include polytetrafluoroethylene (PTFE), and polyhexafluoropropylene. Highly halogenated polymers, although less resistant to chemical attack, may also be used. Examples include polychlorotrifluoroethylene, copolymers of chlorotrifluoroethylene and ethylene, copolymers of ethylene and tetrafluoroethylene, copolymers of hexafluoropropylene and tetrafluoroethylene, copolymers of vinylidene fluoride with tetrafluoroethylene, hexafluoropropylene, chlorotrifluoroethylene or pentafluoropropylene, and terpolymers of vinylidene fluoride, hexafluoropropylene and tetrafluoroethylene. Also contemplated are fluoroalkyl acrylates such as poly (1,1-dihydroheptafluorobutyl acrylate), poly (3-perfluoro methoxy-1,1-dihydroheptafluoropropyl acrylate, poly(trifluoroisopropyl methacrylate) and the condensation product of adipic acid and 2,2,3,3,4,4-hexafluoropentanediol.

Other perfluorinated polymers contemplated include fluorinated polymers containing functional groups, such as sulfonic acid or carboxylic acid groups, or alkali metal, e.g., sodium, or ammonium salts thereof. Typical examples of such perfluorinated polymers are those described in U.S. Pat. Nos. 3,282,875, 3,624,053, 3,849,243, 3,506,635 and British Patent No. 1,145,445. The aforesaid perfluorinated polymers are those typically having a fluorinated hydrocarbon backbone chain to which are attached the functional groups, or pendant side chains which in turn carry the functional groups. These polymers are prepared by copolymerizing a first fluorinated vinyl monomer(s), such as vinyl fluoride, hexafluoropropylena, vinylidene fluoride, trifluoroethylene, chlorotrifluoroethylene, perfluoro (alkyl vinyl ether), tetrafluoroethylene or mixtures thereof, with a second fluorinated vinyl monomer(s) having the functional acid group attached thereto or attached to a pendant side chain, e.g., $-C(R_f)F-CF_2-SO_2F$, $-O-C(R_f)F-CF_2-SO_2F$, $+C(Z)+F_tW$, or $-O+C(Z)+F_tW$, wherein $R_f$ is F, Cl, or a $C_1$-$C_{10}$ perfluoroalkyl group, Z is F or $CF_3$, t is a number from 1 to 12 and W is $-COOR$ or $-CN$, wherein R is lower alkyl, e.g., $C_1$-$C_4$ alkyl. Such materials are offered under the trademark NAFION ® by E. I. Du Pont de Nemours and Company, and under the trademark FLEMION ® by the Asahi Glass Company, Ltd.

The aforesaid polymeric materials may be used in various forms. Of particular utility are fine powders and colloidal aqueous dispersions of the polymers. Finely divided granular forms may also be used. Aqueous colloidal dispersions are preferred. Aqueous dispersions containing from about 30 to about 70 weight percent solids are contemplated. Polytetrafluoroethylene (PTFE) is preferred.

A variety of commercially available forms of PTFE may be used to prepars the porous flexible sheet of the present invention. Among such forms are TEFLON ® K-10 and K-20 fluorocarbon polymer. TEFLON K-10 is a free-flowing white powder having an average particle size of about 500 microns. TEFLON ® K-20 fluorocarbon polymer is an aqueous suspensoid of the fluorocarbon particles which range in size from about 0.05 to about 0.5 microns. Both the K-10 and K-20 forms are offered for sale by the E. I. du Pont de Nemours & Company. TEFLON ® K-20 typically contains about 33 percent by weight solids and the dispersion is stabilized with approximately 1 percent by weight of a nonionic surfactant. Other aqueous suspensoids of fluorocarbon polymer, e.g., those containing from about 30 to about 70 weight percent solids, may also be used. The higher solids content suspensoids will contain higher amounts of surfactant for stabilization. An aqueous dispersion of the fluorocarbon polymer, e.g. PTFE, is preferred because of the smaller particle size of the fluorocarbon polymer present in the dispersion.

The preparation of polytetrafluoroethylene is well known and is illustrated by U.S. Pat. Nos. 2,510,112, 2,587,357, and 2,685,707. The particle size of the PTFE may vary from 0.05 to about 500 microns depending on the supplier and the product form, i.e., a free-flowing white powder or aqueous dispersion. Powdered PTFE may, of course, be dispersed by the use of typical non-ionic surfactants, such as used in the preparation of TEFLON ® K-20 fluorocarbon polymer. The preparation of the other described polymeric materials, e.g., by bulk, solvent or emulsion polymerization, is known from the polymer literature.

It has been recognized that, when subjected to shear stresses, small particles of polymeric materials, e.g., perfluorinated polymers such as PTFE, will form fibrils or fibers of a microscopic size. Such forces involve a combination of compression and attenuation forces which have the effect of lengthening and separating the polymar particles. The aspect ratio of the fibrils, i.e., the length to diameter ratio, is preferably very large. Transmission electron micrographs of the fibrils show them to be as fine as about 500 angstroms in diameter.

In accordance with an embodiment of the present invention, a homogeneous dry mixture of amorphous, precipitated silica and fibrillatable polymeric material is subjected to mechanical working, i.e., mechanical shear blending forces (fibrillating), to form a mixture of silica and polymer fibrils of a desired consistency. The consistency of the blended mixture may be controlled by the duration (time) of blending or the final torque reached by the blending equipment. The shear blending is conducted at temperatures less than the melting or sintering temperatures of the polymeric material but usually higher than 50° C. In the case of polytetrafluoroethylene, temperatures of from about 50° C. to about 220° C. may be used. More usually, temperatures will be limited by the operating limitations of the shear blender or available heat source. Commonly, shear blending of PTFE will be conducted at temperatures between about 50° C. and about 110° C. or 120° C. It is also contemplated that the shear blending may be initiated at lower temperatures, e.g., 50° C.,and increased during the blending process to the maximum desired temperature, e.g., 110° C. Shear blending will be performed for a time sufficient to obtain the desired degree of fibrillation, e.g., for between about 0.3 or 0.5 and 10 minutes. More particularly, the blending process is performed at temperatures of between about 70° C. and 90° C. for between about 1 and 3, e.g., 2, minutes. Care should be observed during the shear blending or fibrillating of the polymeric material alone or of the polymer-silica mixture that temperatures sufficient to melt or sinter the resin are not reached. Further, it is preferred that the shear blending be conducted for a time sufficient to form initial fibrils or fibers of the polymer but that such shear blending is not continued beyond a time when the initial fibrils are themselves broken down into smaller fibers. The shear blending may be performed on a continuous or batch basis.

In the initial stage of blending, the mixture is powdery, the torque required for turning the head of the high shear blender is almost zero and little fibrillation of the polymeric material has occurred. In a second stage of blending, the mixture becomes a soft mass capable of being formed into a soft ball, fibrillation sufficient to allow formation of a soft ball has occurred and the torque of the blender has increased accordingly. This soft mass may be readily rolled (processed) into sheet form without the application of external heating. Continuation of the blending process (a third stage) results in further fibrillation with a significant increase in the torque required. The previously soft mass becomes harder, more difficult to compress, and can be rolled into sheets with the application of heat, e.g., hot rolling on a hot (200°–250° F.; 93°–121° C.) steel plate with a hot (105° C.) roller. Processing at this stage may require at least one repetition of the sheet forming process, including folding of the rolled sheet on itself, and re-rolling of the folded sheet. Re-rolling may include re-orienting (rotating) the folded sheet with respect to the rolls of the sheet forming device.

Thus, the sheet forming process may comprise the sequential steps of initially rolling the blended mass into a sheet, folding the sheet thus formed one or more times, and re-rolling the folded sheet into a further sheet. Re-rolling of the mass may be performed any number of times in order to form a substantially defect-free sheet of uniform thickness. Such properties in a sheet may be readily ascertained by holding the sheet up to the light and observing the uniformity of the light transmitted through the sheet. Generally, re-rolling 2, 3, 4 or 5 times will be sufficient. The number of times re-rolling of the folded sheet or mass is performed will depend on the compressibility of the blended mass, i.e., whether the mass is hard or soft and the degrees of such hardness. The harder the mass—the larger the potential number of re-rollings of the sheet that may be necessary.

In a subsequent stage (fourth), the mass becomes very hard and is very difficult to form into the shape of a substantially defect-free sheet of uniform thickness. The torque in this fourth stage is high and reaches a maximum. Overfibrillation of the polymaric material probably occurs in this fourth stage. Continued shear blending of the polymeric material (fifth stage) results in the hard mass beginning to crumble to a powder and a consequent lowering of the torque values registered by the blender.

In accordance with the present invention, shear blending is continued until a point in the third stage (below the maximum registered torque) where the resultant sheet possesses the desired level of tensile strength and porosity. The absolute values of fibrillation time and the registered torque readings to obtain the tensile strength and porosity desired will also depend both on the type of amorphouse precipitated silica and the amount of fibrillatable polymer used. Such values can be readily determinad by one skilled in the art with little experimentation. The absolute torque readings will also depend on the number and type of blades and head volume of the blender, the speed (rpm.) at which the head rotates and the temperature of the head.

Fibrillation or intensive mixing of the polymer or polymeric material-silica blend may be performed in commercially available intensive mixing devices, which are sometimes referred to as internal mixers, kneading mixers, and double-blade batch mixers as well as intensive mixers. Such mixers are used commercially for the compounding of rubbers and plastics. The most popular mixer of this type is the sigma-blade or sigma-arm mixer. Some commercially available batch mixers of this type are those sold under the common designations Banbury mixer, Mogul mixer, C. W. Brabender Prep mixer and C. W. Brabender sigma-blade mixer.

In accordance with an embodiment of the present invention, precipitated amorphous silica and fibrillatable polymeric material are combined and mixed, e.g., in a Waring blender or Waring blender-type mixsr, to form a homogeneous mixture in the relative amounts previously described. The homogeneous mixture may be prepared by low energy mixing of the silica and polymer before subjecting the mixture to shear blending forces or the homogeneous mixture can be prepared in the intensive mixer previously described. Further, it is contemplated that a master batch of silica and polymeric material comprising about 90 to 95 weight percent silica and about 5 to 10 weight percent polymeric material may be prepared and this master batch diluted with additional silica to produce the compositions described for the porous flexible sheet. Still further, it is contemplated that the polymeric material may be first fibrillated and the fibrils then combined with the silica with gentle mixing or blending.

In a further embodiment of the present invention, it is contemplated that a mixture of silica and fibrillatable polymeric material be added to a heel of silica-fibrillated polymer (usually of the same relative composition). It has been found that the time required for intensive blending (fibrillation) of the resulting mixture is less than that required for the silica-fibrillatable polymeric material blend alone. The heel can represent from about 1 to about 50 weight percent of the total solids subjected to intensive blending, e.g., about 10 weight percent.

The blending of an aqueous dispersion of polymeric material such as PTFE, e.g., TEFLON® K-20, with silica to prepare an admixture of between about 93 and 99.5 weight percent silica and 0.5 and 7 weight percent fibrillatable polymeric material does not result in the formation of a tacky mass or a mixture in which the absorptive capacity of the silica is exceeded since the silica is capable of absorbing all of the water used to disperse the polymer particles and still remain dry to the touch and free-flowing. Such admixtures will be referred to herein as being substantially dry.

In accordance with an embodiment of the present invention, a substantially dry, substantially homogeneous admixture of fibrillatable polymeric material, e.g., PTFE, and silica, e.g., amorphous precipitated silica, is subjected to mechanical shear blending forces, i.e., the mixture is shear blended dry, to form a substantially dry, substantially homogeneous mixture of silica and fibrillated, unsintered polymeric material, e.g., perfluorinated polymer. Such blending is performed in the absence of added liquid. The resulting shear blended mass of silica and fibrillated polymeric material has a soft, compressible dough-like consistency for sheets of low tensile strength, but will have a hard, dough-like consistency of slight compressibility for sheets of high tensile strength.

The substantially dry, silica-fibrillated polymeric material homogeneous mixture is then dry-formed into a porous flexible sheet by dry rolling or passing it through sets of rollers, e.g., the mixture is calendered. Biaxial calendering may also be applied to the sheets. Forming of the silica-fibrillated polymer mixture into sheets is performed at temperatures similar to those used for shear blending, e.g., temperatures of between about 50° C. and about 220° C., more particularly between about 100° C. and about 150° C.

Conditions employed in the dry rolling are such as to avoid sintering or melting of the fibrillated polymeric material, e.g., perfluorinated polymer particles and/or fibrils, and to avoid further fracturing of the polymeric material fibrils. Forming of the sheet can be accomplished by passing the admixture through one or more sets of rollers, e.g., heated rollers, having roll gaps ranging from about 5 to about 100 mils (0.005 inches—0.10 inches), e.g., between about 40 and 80 mils, more particularly between about 45 and 65 mils. The fibrillation (intensive mixing) and sheet forming steps may be combined in one piece of equipment or performed separately in several pieces of equipment that are joined to function in a continuous fashion.

Precipitated amorphous silica may be prepared by acidification with inorganic acid, e.g., hydrochloric, sulfuric or carbonic acid, of an aqueous solution of alkali metal silicate, e.g., sodium silicate, to produce a finely-divided siliceous powder. See, for example, U.S. Pat. No. 2,940,830. Amorphous precipitated silica used to prepare the silica-fibrillated polymer blend described herein is a free-flowing, white, fluffy, pulverulent powder that is dry to touch. Despite appearing dry, the silica normally contains between about 2 and 8 percent "free water" by weight. Free water is that water which is removed from the silica by heating it at 105° C. for 24 hours. Precipitated silica also contains "bound water", which refers to that water removed by heating the silica at ignition temperature, i.e., 1000° C. to 1200° C. for an extended period, e.g., 24 hours. Bound water can constitute between about 2 and 6 weight percent of the silica. Amorphous precipitated silica has a high capacity for absorbing liquids, such as water, and can absorb significant quantities of liquid and still remain dry to the touch and free-flowing. For example, some amorphous precipitated silica may absorb as much as 250 or more milliliters of water per 100 grams of silica and still remain free-flowing. Chemically, finely-divided, amorphous precipitated silica contains at least 85, typically at least 90 and more typically 93-97 weight percent $SiO_2$ on an anhydrous basis, i.e., not including free water.

Amorphous precipitated silica that may be used in the present invention to form the porous flexible sheet may have a BET surface area from about 30 to about 700 square meters per gram, e.g., 100-250 or 400-700 square meters per gram; an oil absorption of from about 100 to about 380 milliliters of oil, e.g., dibutyl phthalate, per 100 grams of silica, usually between about 150 and 300 or 250 to 380 milliliters of oil per 100 grams of silica; and a water absorption value of from about 100 to about 250 milliliters per 100 grams of silica. The particular surface area and oil absorption of the silica will vary depending on the process conditions used to prepare the precipitated silica, as is known in the art.

Amorphous precipitated silica is customarily prepared by the reaction of an aqueous solution of a soluble silicate, e.g., sodium, lithium or potassium silicate, most usually sodium silicate, with inorganic mineral acid, most notably carbonic acid, sulfuric acid or hydrochloric acid. Typically sodium silicate having an $SiO_2$: $Na_2O$ ratio of about 3.3:1 is used to prepare the aqueous solution of soluble silicate, or sulfuric acid. Particularly suited as the mineral acid is carbonic acid, which is formed in situ by the introduction of carbon dioxide into the silicate solution, or sulfuric acid. The general method for preparing amorphous precipitated silica in the aforementioned manner is described in U.S. Pat. No. 2,940,830. The resulting precipitated silica is usually washed in suitable vessels to remove a substantial portion of the soluble alkaline metal inorganic salt incorporated therein during the precipitation process and thereafter, the pH of the silica adjusted with an inorganic mineral acid, usually hydrochloric acid (although sulfuric acid may be used), to a final essentially neutral pH of between about 6.5 and about 7.5, although silica having an acid pH may be used. The resulting silica is dried, e.g., in a rotary or drum drier, or spray dried, and the dried product milled and/or screened to produce the commercial product.

Also contemplated is amorphous precipitated silica prepared in accordance with the method described in U.S. Pat. No. 3,129,134. There, the silica is prepared by precipitating water-insoluble siliceous product from an aqueous alkali metal silicate solution in the presence of finely-divided particles of a water-insoluble inorganic metal salt, e.g., inorganic metal salts of carbonic acid such as the alkaline earth metal salts of carbonic acid, e.g., calcium carbonate. The water-insoluble inorganic metal salt is then substantially removed from the resulting insoluble siliceous precipitate by treatment with acid, e.g., hydrochloric acid. This treatment converts the cation of the insoluble inorganic salt into a water-soluble salt of the treatment acid and liberates the anion of the salt as a gas. The resulting amorphous precipitated silica is composed of agglomerates of substantially hollow spherical particles having a predominant hollow particle size (diameter) of between $5 \times 10^{-6}$ mm (0.005 microns) and $5 \times 10^{-3}$ mm (5 microns). The silica has a BET surface area of between about 50 and 250 square meters per gram, preferably between 75 and 200 square meters per gram, and an oil absorption of from about 150 to 300, preferably from about 200 to 300, more preferably from about 230 to 270, milliliters of oil per 100 grams of silica. The silica desirably contains less than 2 weight percent of the oxide of the metal of the water-insoluble inorganic metal salt, e.g., calcium oxide, and preferably contains less than 1, more preferably less than 0.5, and most preferably less than 0.1, weight percent of such metal oxide.

Amorphous precipitated silica that may also be used in the preparation of the porous flexible sheet of the present invention are those materials described in British Patent Publication 2,169,129, and U.S. Pat. Nos. 4,681,750 and 4,495,167 the disclosures of which are incorporated herein into by reference. The preparative method described in said British Patent publication involves preparing an aqueous alkaline metal silicate solution having a particular alkaline metal oxide concentration at preselected temperatures. Thereafter, additional alkaline metal silicate and acidifying agent are added slowly and simultaneously to the aqueous alkaline metal silicate solution with agitation and at a rate sufficient to maintain the initial alkaline metal oxide concentration at substantially the same level until various multiples of the initial amount of alkaline metal silicate have been added. Thereafter, additional acidifying agent is added to the resulting slurry until the pH is from about 8 to about 9 and the resulting slightly alkaline slurry aged. Subsequent to the aging step, additional acidifying agent is added to the aged slurry until the pH thereof is acidic, e.g., from about 3.8 to about 4.7, and the precipitated silica recovered from the acidified slurry washed and dried.

In one embodiment described in the aforesaid British Patent Publication, the initial aqueous alkaline metal silicate contains between about 2.1 and 2.6 grams per liter of alkaline metal oxide at a temperature of between about 82° C. and 85° C. Further alkaline metal silicate in amounts equal to from about 14.5 to about 19 times the amount of alkaline metal silicate present in the first aqueous alkaline metal silicate solution is added during the simultaneous addition of further alkaline metal silicate and acid. In a second embodiment, the alkaline metal oxide concentration of the first aqueous alkaline metal silicate solution is from about 5.6 to about 7.2 grams per liter and the temperature thereof is between about 88° C. and about 92° C. Between 2 and about 5 times the amount of alkaline metal silicate present in the first aqueous alkaline metal silicate solution is added during the simultaneous addition of said further alkaline metal silicate and acidifying agent.

Aging of the aforedescribed alkaline precipitated silica slurry can be from about 15 to 90 minutes, although longer aging times may be utilized. Aging temperatures are usually at or near reaction temperatures.

In the preparative method described in U.S. patent 4,495,167, precipitated silica is prepared by simultaneously adding sodium silicate and sulfuric acid to a body of water at 40°-42° C. and keeping the pH of the reaction medium in the range of 6-7 while maintaining shearing mixing during the precipitation. The precipitation time is reported as 146 minutes, which is interrupted for 90 minutes from the 13th to 103rd minute. The final silica concentration is 46 grams per liter. The suspension of precipitated silica is aged for from 12 to 17 hours after which the silica is recovered from the suspension by filtration and the filter cake washed, liquified with water, and/or water and acid, and the silica spray dried. The product is described as having a BET surface area of from 400-600 m2/g and a dibutyl phthalate absorption number (DBP number) of from 310-380, e.g., 340-380, 320-360 and 310-360.

In a preferred embodiment of the present invention, the synthetic amorphous silica is precipitated silica. However, it is. contemplated that the synthetic amorphous silica may comprise a mixture of precipitated silica and small amounts, e.g., up to 25 weight percent of pyrogenic silica and/or silica gel. More particularly, the synthetic amorphous silica may comprise amorphous precipitated silica and from 0 to about 25 weight percent, e.g., from about 5 to 10 weight percent, of pyrogenic silica, silica gel or mixtures of pyrogenic silica and silica gel.

Pyrogenic or fumed silicas are prepared commonly by reacting silicon tetrachloride vapor with oxygen and hydrogen gas at high temperatures. Pyrogenic silicas have high external surface areas. Silica gels are of two types—hydrogels and aerogels. Hydrogels may be prepared by reacting a soluble silicate such as sodium silicate with strong sulfuric acid. The gel is washed salt-free, dried, micronized and classified. Aerogels may be prepared from hydrogels by displacing the water content with an alcohol which is recovered by heating the gel in an autoclave. Gels generally have a BET surface area in the range of from 300 to 1000 square meters per gram. Both pyrogenic silicas and silica gels and their preparation are well known in the art.

The porous flexible sheet of the present invention may be laminated by methods known in the art to a non-woven web of fibrous polymeric material, which may be a synthetic organic polymer or an inorganic material, e.g., a non-woven mat or sheet of polyester, polyolefin such as polypropylene, polyamide, and carbon or glass, e.g., a fiber glass mat. The resulting laminated article will have increased physical strength and will be self supporting for improved handling characteristics. The porous flexible sheet may be laminated to one side of a non-woven mat, or the non-woven mat may be sandwiched between two porous flexible sheets of the present invention.

In addition, it is contemplated that the physical strength of the porous flexible sheet may be increased by incorporating into the silica-fibrillatable polymer mixture small amounts, e.g., less than about 10 weight percent, (based on the mixture) of a conventional reinforcing agent, such as loose or chopped fibers of the aforedescribed synthetic organic or inorganic materials, e.g., fiber glass or chopped fiber glass. The finer the particle size of the reinforcing agent, the larger the amount that may be incorporated into the mixture, e.g., before shear blending. More particularly, from about 0.25 to 10 weight percent of reinforcing agent may bs incorporated into the mixture and consequently into the sheet. Coarser particles, e.g., chopped fiber glass, may be used in amounts of from about 0.25 to about 1 weight percent, whereas finely-divided materials, e.g., powders may be used in amounts up to about 10 weight percent, e.g., from about 1-8 or 3-5 weight percent.

The shear blended mass containing the reinforcing agent is manner described with respect to the non-reinforced sheet.

The present invention is more particularly described in the following examples, which are intended as illustrative only, since numerous modifications and variations therein will be apparent to those skilled in the art. In the following examples, the high shear blender used was a Brabender (Plastograph PLV3) having a cam type head (GT 272) at 50 rpm and oil (120° C.) heating. Torque values on this device for blending the aforedescribed silica and polymeric material may be in the range of 200 to 3000 gram (force) meters, e.g., from about 800 to 2200 gram meters.

EXAMPLE 1

Amorphous precipitated silica was dry blended with sufficient TEFLON® K-20 aqueous suspensoid (33 weight percent) of fluorocarbon (PTFE) particles to provide 1 2 and 3 weight percent of the fluorocarbon particles in the resulting blend. Blending was performed for 2 minutes in a Brabender Plastograph Model PLV3 low speed, high shear mixer with a cam-type head (GT 272) at 90° C. and 50 rpm. The silica had a BET surface area of about 163 m2/gram, an oil absorption of about 197 milliliters/100 grams, and average Coulter counter agglomerate particle size of about 13.5 microns. The silica had a pH of 6.6 and contained 6.3 weight percent "free" water. The blended samples were hand rolled dry immediately after being removed from the Brabender into thin sheets of from about 75 to 100 mils (0.19 to 0.25 centimeters). Two inch (5.1 centimeters) diameter discs prepared from the silica-2% fluorocarbon blend were tested for electrical resistance in a laboratory cell at 25° C. The electrolyte used was an aqueous solution of 37.5 weight percent sulfuric acid.

The laboratory cell was constructed from two 1-inch O-ring type glass joints. Each half of the cell was mounted on one finger of a clamp-type beaker holder so that when the fingers were closed the halves would seal against either side of the two inch diameter test discs. The sealing surfaces of the cell were lightly coated with RTV silicone rubber to effect a good seal. A lightly platinized platinum disc electrode was sealed into each half of the cell and an insulated lead from each half of the cell conducted through a glass seal to the conductivity bridge. The area of each electrode was 0.785 square inches (5.1 square centimeters). The cell constant at 25° C. was 0.4788.

A four-liter plastic beaker was charged with enough electrolyte to cover the cell when immersed. The test disc which had been equilibrated in the electrolyte and degassed, was clamped between the two halves of the cell and the resistance measured. The resistance without the separator in place was also determined and the difference in the two readings represented the net resistance of the test disc. Resistance values varied from 1.5 to 2.4 milliohm—in 2 (square inches) per 10 mils (0.01 inches).

EXAMPLE 2

120 grams of the amorphous precipitated silica used in Example 1 was dry blended with TEFLON® K-20 aqueous suspensoid of fluorocarbon particles in an amount sufficient to obtain 2 weight percent fluorocarbon particles in a Brabender mixer for two minutes at 90° C. and 50 rpm. The resulting blend was rolled out dry on aluminum foil using a roller filled with water having a temperature of about 72° C. Two inch (5.1 centimeter) diameter discs cut from these sheets were tested for electrical resistance in the laboratory cell described in Example 1 at 25° C. using an aqueous solution of 37.5 weight percent sulfuric acid as the electrolyte. Resistance values obtained were about 2.5-2.6 milliohm—in 2/0.01 inch

EXAMPLE 3

The procedure of Example 2 was repeated with 40 grams of the amorphous precipitated silica and sufficient of the TEFLON® K-20 suspensoid to obtain a blend of silica—1.5 weight percent fluorocarbon. Blending was at 70° C. in the Brabender for 2½ minutes at 50 rpm. Resistance values of discs cut from sheets dry formed from th blend were determined in the laboratory cell described in Example 1 and varied from 5 to 9 milliohm—in 2/0.01 inch .

EXAMPLE 4

29.8 grams of amorphous precipitated silica of the type described in Example 1 was mixed with sufficient TEFLON® K-20 aqueous suspensoid of fluorocarbon (PTFE) particles to provide 1 weight percent of the fluorocarbon particles. The resulting mixture was divided into two batches of about 15 grams each. Each batch was dry blended in the Brabender mixer of Example 1 at 105° C. One batch was blended for 5 minutes and 53 seconds. The second batch was blinded for 6 minutes and 20 seconds. The resultant blends were combined and the mixture hand rolled with folding into a 52-52.3 mil thick sheet on a 250° F. (121° C.) hot plate using a 200° F. (93° C.) hot pin. The tensile strength of a one-inch strip of the sheet was measured on an Instron tensile testing device. A dry strip had a tensile strength of 6.9 pounds per square inch (psi) (47.6 kPa) and a strip wet with water had a tensile strength of 11.0 psi (75.8 kPa). The porosity of the sheet was calculated to be 86.4 percent.

A portion of the sheet was placed in a desiccator connected to a vacuum and the desiccator evacuated for one hour at a pressure of 26-27 inches of mercury. This sheet was then covered with sulfuric acid (about 37 percent ) while maintaining the vacuum. The electrical resistance of the acid saturated-sheet was measured using the palico battery resistance test system (no. 9100-2) in a sulfuric acid (37 percent) bath having a 5 square inches (32.3 cm2) aperture. Resistance values were calculated to be between 1.22 and 1.5 milliohm—in2 per 10 mils based on readings taken from the instrument. The Palico battery resistance test system was found to be more accurate in measuring electrical resistance than the laboratory cell described in Example 1.

EXAMPLE 5

29.8 grams of amorphous precipitated silica was mixed with sufficient TEFLON® K-20 aqueous suspensoid of fluorocarbon (PTFE) particles to provide 2 weight percent of the fluorocarbon particles. The silica had a BET surface area of 628-698 m2/g, an oil absorption of 277-280 ml, a Coulter counter mean agglomerate size of 29-35 microns, a pH of 7.4-7.6 and a sodium sulfate content of 0.5-0.9 percent. The resulting silica-PTFE mixture was divided into two batches of about 15 grams. Each batch was dry blended in the Brabender high shear mixer of Example 1 to a torque of 1000-1500 gram meters. The resultant blends were combined and the mixture hand rolled with folding into a sheet of about 53 mils in the manner described in Example 4. The porosity of the sheet was calculated to be 87.9 percent from its geometric dimensions, and the mass and density of the silica and PTFE. The Instron tensile strength of a dry one-inch strip of the sheet was 20.6 psi (142 kPa). A portion of the sheet was placed in a desiccator connected to a vacuum and the desiccator evacuated for 10 minutes at a pressure of 23-25 inches of mercury. The sheet was saturated with sulfuric acid and its electric resistance measured in accordance with the method described in Example 4. The electrical resistance was calculated to be about 0.75 milliohm-in$^2$ per 10 mils.

EXAMPLE 6

The procedure and starting materials of Example 5 was followed except that sufficient TEFLON ® K-20 aqueous suspensoid was used to provide 5 weight percent of the fluorocarbon particles. The silica-PTFE mixture was divided into two batches of about 15 grams each and each batch blended in the Brabender high shear mixer of Example 1 for 44 seconds to a torque of about 1500-2000 gram meter. The resulting blends were combined and the mixture hand-rolled with folding into a sheet of about 53 mils in the manner described in Example 4. The porosity of the sheet was calculated to be about 87 percent. The Instron tensile strength of a dry one-inch strip was 48.1 psi (331.7 kPa). Electrical resistance of this sheet was not measured due to an insufficient quantity of the sheet.

While the invention has been described in detail with respect to certain embodiments thereof, it is understood that the invention is not intended to be limited to such details except as and insofar as they appear in the appended claims.

We claim:

1. A method for preparing a non-woven, porous flexible sheet of hydrophilic silica and fibrillated polymeric material, comprising subjecting a free-flowing, substantially dry mixture of from about 93 to about 99.5 weight percent particulate synthetic amorphous silica and about 0.5 to about 7 weight percent of fibrillatable polymeric material to mechanical shear blending forces at temperatures insufficient to sinter the polymeric material, thereby to form a substantially dry, substantially homogeneous mixture of silica and unsintered, fibrillated polymeric material, and thereafter dry-forming the blended mixture into a porous flexible sheet, said synthetic amorphous silica comprising precipitated silica and from 0 to about 25 weight percent of pyrogenic silica, silica gel or mixtures of pyrogenic silica and silica gel.

2. The method of claim 1 wherein the mixture contains from about 95 to about 98.5 weight percent silica and from about 1.5 to about 5 weight percent of fibrillatable polymeric material.

3. The method of claim 1 wherein the polymeric material is a perfluorinated polymer.

4. The method of claim 3 wherein the perfluorinated material is polytetrafluoroethylene.

5. The method of claim 4 wherein an aqueous dispersion of polytetrafluoroethylene is mixed with the silica.

6. The method of claim 4 wherein the mixture contains from about 95 to about 98.5 weight percent silica and from about 1.5 to about 5 weight percent polytetrafluoroethylene.

7. The method of claim 4 wherein the mixture contains from about 96 to about 98.5 weight percent silica and from about 1.5 to 4 weight percent polytetrafluoroethylene.

8. The method of claim 6 wherein an aqueous dispersion of polytetrafluoroethylene is mixed with the silica.

9. The method of claim 3 wherein temperatures of between about 50° C. and about 220° C. are used to shear blend the silica—perfluorinated polymer mixture, and to mechanically form the resulting shear blended mixture into sheet form.

10. The method of claim 3 wherein the sheet has a thickness of from about 5 to about 100 mils.

11. The method of claim 9 wherein the blended mixture is formed into a sheet by dry rolling the mixture with a heated roller.

12. The method of claim 6 wherein the silica-polytetrafluoroethylene mixture is shear blended at temperatures of from about 50° C. to about 220° C. and the blended mixture is formed into a sheet by dry rolling the mixture at temperatures of from about 50° C. to about 220° C.

13. The method of claim 8 wherein the precipitated silica has a BET surface area of from about 30 to 700 square meters per gram and an oil absorption of from about 100 to about 380 milliters of oil.

14. The method of claim 13 wherein the precipiatated silica has a BET surface are of from about 400 to 700 square meters per gram and an oil absorption of from about 250 to about 380 milliliters of oil.

15. A non-woven, porous flexible sheet consisting essentially of a substantially homogeneous mixture of from about 93 to about 99.5 weight percent synthetic amorphous hydrophilic silica and from about 0.5 to about 7 weight percent of fibrillated, unsintered polymeric material, said synthetic amorphous silica comprising precipitated silica and from 0 to about 25 weight percent of pyrogenic silica, silica gel or mixtures of pyrogenic silica an silica gel, said sheet having a tensile strength of less than 75 pounds per square inch.

16. The porous flexible sheet of claim 15 wherein the polymeric material is a perfluorinated polymer.

17. The porous flexible sheet of claim 16 wherein the perfluorinated polymer is polytetrafluoroethylene.

18. The porous flexible sheet of claim 17 wherein the sheet contains from about 95 to about 98.5 weight percent silica and from about 1.5 to about 5 percent polytetrafluoroethylene.

19. The porous flexible sheet of claim 18 wherein the sheet has a thickness of from about 5 to about 100 mils.

20. The porous flexible sheet of claim 19 wherein the sheet has a porosity of from about 85 to about 92 percent.

21. The porous flexible sheet of claim 20 wherein the sheet, when saturated with 37 percent sulfuric acid, has an electrical resistance of less than about 3.5 milliohm-in$^2$/10 mil.

22. The porous flexible sheet of claim 21 wherein the electrical resistance is less than about 2.5 pl milliohm-in$^2$/10 mil.

23. The porous flexible sheet of claim 21 wherein the precipitated silica has a BET surface area of from about 30 to 700 square meters per gram and an oil absorption of from about 100 to about 380 milliliters of oil.

24. The porous flexible sheet of claim 23 wherein the precipitated silica has a BET surface area of from about 400 to about 700 square meters per gram and an oil absorption of from about 250 to about 380 milliliters of oil.

25. The porous flexible sheet of claim 15 wherein the sheet contains from about 95 to about 98.5 weight percent silica and from 1.5 to 5 weight percent of fibrillatable polymeric material.

26. The porous flexible sheet of claim 25 wherein the sheet, when saturated with 37 percent sulfuric acid, has an electrical resistance of less than 3.5 milliohm-in$^2$/10 mil.

27. An absorbed electrolyte gas recombinant battery comprising battery plates of opposite polarity and a microporous separator between said plates, said separator being the non-woven, porous flexible sheet of claim 15.

28. The battery of claim 27 wherein the battery is a lead-acid battery.

29. The battery of claim 28 wherein the fibrillated polymeric material of the non-woven, porous flexible sheet is polytetrafluoroethylene.

30. A separator for an electrolyte gas recombinant battery comprising a non-woven, porous flexible sheet consisting essentially of a substantially homogeneous mixture of from about 93 to about 99.5 weight percent synthetic amorphous silica and from about 0.5 to about 7 weight percent of fibrillated, unsintered polymeric material, said synthetic amorphous silica comprising precipitated silica and from 0 to about 25 weight percent of pyrogenic silica, silica gel or mixtures of pyrogenic silica and silica gel, said sheet having a tensile strength of less than 75 pounds per square inch.

31. The separator of claim 30 wherein the separator consists essentially of from about 95 to about 98.5 weight percent silica and from 1.5 to 5 weight percent of fibrillatable polymeric material.

32. The separator of claim 30 wherein the polymeric material is a perfluorinated polymer.

33. The separator of claim 32 wherein the perfluorinated polymer is polytetrafluoroethylene.

34. The separator of claim 33 wherein the separator consists essentially of from about 95 to about 98.5 weight percent silica and from about 1.5 to about 5 weight percent polytetrafluoroethylene.

35. The separator of claim 34 wherein the sheet has a thickness of from about 5 to about 100 mils.

36. The separator of claim 35 wherein the porosity of the separator is from about 85 to about 92 percent.

37. The separator of claim 36 wherein the electrical resistance of the separator is less than about 3.5 milliohm-in$^2$/10 mil.

38. The separator of claim 37 wherein the battery is a lead-acid battery.

39. The separator of claim 37 wherein the precipitated silica has a BET surface area of from about 30 to 700 square meters per gram and an oil absorption of from about 100 to about 380 milliliters of oil.

40. The separator of claim 39 wherein the precipitated silica has a BET surface area of from about 400 to about 700 square metes per gram and an oil absorption of from about 250 to about 380 milliliters of oil.

41. A non-woven, porous flexible sheet consisting essentially of a substantially homogeneous mixture of from about 93 to about 99.5 weight percent synthetic amorphous precipitated silica and from about 0.5 to about 7 weight percent of fibrillated, unsintered perfluorinated polymer, said sheet having a tensile strength of less than 65 pounds per square inch, and when saturated with 37 percent sulfuric acid, has an electrical resistance of less than 3.5 milliohm-in$^2$/10 mil.

42. The non-woven, porous flexible sheet of claim 41 wherein the perfluorinated polymer is polytetrafluoroethylene.

43. A method for preparing a non-woven, porous flexible sheet of hydrophilic silica and fibrillated perfluorinated polymeric material, comprising subjecting a free-flowing, substantially dry mixture of from about 95 to about 98.5 weight percent particulate synthetic amorphous silica and about 1.5 to about 5 weight percent polytetrafluoroethylene to mechanical shear blending forces at temperatures of from about 50° C. to about 220° C., thereby to form a substantially dry, substantially homogeneous mixture of silica and unsintered, fibrillated polytetrafluoroethylene, and thereafter dry-forming the blended mixture into a porous flexible sheet by performing at least one repetition of the forming steps of dry rolling the mixture at temperatures of from 50° C. to about 220° C., folding the rolled sheet, and re-rolling the folded sheet, said synthetic amorphous silica comprising precipitated silica and from 0 to about 25 weight percent of pyrogenic silica, silica gel or mixtures or pyrogenic silica and silica gel.

44. The method of claim 43 wherein the sheet forming process comprises from 2 to 5 repetitions of the forming steps.

45. A method for preparing a non-woven, porous flexible sheet of hydrophilic silica and fibrillated polymeric material, comprising subjecting a free-flowing, substantially dry mixture of from about 93 to about 99.5 weight percent particulate synthetic amorphous silica and about 0.5 to about 7 weight percent of fibrillatable polymeric material to mechanical shear blending forces in the presence of a heel of from about 93 to about 99.5 weight percent synthetic amorphous silica and from about 0.5 to about 7 weight percent of fibrillated polymeric material at temperatures insufficient to sinter the polymeric material, thereby to form a substantially dry, substantially homogeneous mixture of silica and unsintered, fibrillated polymeric material, and thereafter dry-forming the blended mixture into a porous flexible sheet, said synthetic amorphous silica comprising precipitated silica and from 0 to about 25 weight percent of pyrogenic silica, silica gel or mixtures of pyrogenic silica and silica gel.

46. The method of claim 45 wherein the heel is from about 1 to about 50 weight percent of the silica-fibrillatable polymeric material blend to be subjected to mechanical shear blending.

47. A non-woven, porous flexible sheet consisting essentially of a substantially homogeneous mixture of from about 93 to about 99.5 weight percent synthetic amorphous hydrophilic silica and from about 0.5 to about 7 weight percent of fibrillated, unsintered polymeric material, said synthetic amorphous silica comprising precipitated silica and from 0 to about 25 weight percent of pyrogenic silica and silica gel, said sheet having a tensile strength of less than 75 pounds per square inch and containing from about 0.25 to about 10 weight percent of a reinforcing agent selected form the group consisting of loose or chopped fibers of synthetic organic polymer and inorganic material.

48. The porous flexible sheet of claim 47 wherein the sheet contains from about 0.25 to about 1 weight percent of chopped fiber glass.

49. A separator for an electrolyte gas recombinant battery comprising a non-woven, porous flexible sheet laminated to a non-woven mat of fibrous material selected from the group consisting of synthetic organic polymers and inorganic material, said porous flexible sheet consisting essentially of a substantially homogeneous mixture of from about 93 to about 99.5 weight percent synthetic amorphous silica and from about 0.5 to 7 weight percent of fibrillated, unsintered polymeric material, said synthetic amorphous silica comprising precipitated silica and from 0 to about 25 weight percent of pyrogenic silica, silica gel or mixtures of pyrogenic silica and silica gel, said sheet having a tensile strength of less than 75 pounds per square inch.

50. The separator of claim 49 wherein the porous flexible sheet is laminated to a non-woven fiber glass mat.

* * * * *